(12) United States Patent
Seliuchenko

(10) Patent No.: US 11,493,613 B2
(45) Date of Patent: Nov. 8, 2022

(54) METHOD OF GENERATING A TIME DOMAIN ECHO WAVEFORM AND ELECTROMAGNETIC RADIATION ECHO WAVEFORM GENERATION SYSTEM

(71) Applicant: Melexis Technologies NV, Tessenderlo (BE)

(72) Inventor: Volodymyr Seliuchenko, Nashua, NH (US)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 307 days.

(21) Appl. No.: 16/849,107

(22) Filed: Apr. 15, 2020

(65) Prior Publication Data

US 2020/0341125 A1    Oct. 29, 2020

(30) Foreign Application Priority Data

Apr. 23, 2019  (EP) ..................... 19170646

(51) Int. Cl.
*G01S 17/10* (2020.01)
*G01S 7/4861* (2020.01)
*G01S 7/484* (2006.01)

(52) U.S. Cl.
CPC .......... *G01S 7/4861* (2013.01); *G01S 7/484* (2013.01); *G01S 17/10* (2013.01)

(58) Field of Classification Search
CPC .......... G01S 17/10; G01S 17/32; G01S 7/484; G01S 7/4861; G01S 7/4865
See application file for complete search history.

(56) References Cited

U.S. PATENT DOCUMENTS

2021/0173088 A1* 6/2021 Seliuchenko .......... G01S 17/89

FOREIGN PATENT DOCUMENTS

EP    3550328 A1    10/2019

OTHER PUBLICATIONS

"3D Camera Based On Gain-Modulated Cmos Avalanche Photodiodes" (O. Shcherbakova, PhD Dissertation, Apr. 2013, <https://core.ac.uk/download/pdf/35317180.pdf>).

* cited by examiner

*Primary Examiner* — Kevin K Pyo
(74) *Attorney, Agent, or Firm* — Harness, Dickey & Pierce, P.L.C.

(57) ABSTRACT

A method of generating a time domain echo waveform comprises: a triggered source of pulsed electromagnetic radiation (108) emitting (202) a plurality of electromagnetic radiation pulses (132). A plurality of reflected pulses (134) irradiates an electromagnetic radiation detector cell (116), the detector (116) generating a plurality of stored electrical measurements in response thereto. The method also comprises generating a time-varying mixing signal and respectively applying (204, 206) phase-shifted variations thereof to the detector (116) while generating the plurality of electrical measurements. A signal pre-processor (126) reads out (210) the plurality of electrical measurements from the detector (116). A signal reconstruction unit (128) and then generates (300, 302, 500, 502) a spectrum (404, 604) in respect of the electrical measurements and a spectrum (406, 606) of the mixing signal. The signal reconstruction unit (126) generates a reconstruction signal spectrum (408) by deconvolving (304, 504) the spectrum (404, 604) of the stored electrical measurements using the spectrum (406, 606) of the mixing signal and then generates the echo waveform by converting (Continued)

(306, 506) the reconstruction signal spectrum (408) to the time domain.

18 Claims, 6 Drawing Sheets

METHOD OF GENERATING A TIME DOMAIN ECHO WAVEFORM AND ELECTROMAGNETIC RADIATION ECHO WAVEFORM GENERATION SYSTEM

FIELD

The present invention relates to a method of generating a time domain echo waveform, the method being of the type that, for example, translates pulses of reflected electromagnetic radiation incident upon an electromagnetic radiation detector cell into an electrical waveform. The present invention also relates to an electromagnetic radiation echo waveform generation system of the type that, for example, generates an electrical waveform in response to irradiating an electromagnetic radiation detector cell with pulses of reflected electromagnetic radiation.

BACKGROUND

In so-called time-of-flight sensing systems and other systems, for example night vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by 90°. Using this illumination and sampling approach, a phase angle between illumination and reflection can be determined, and the determined phase angle can be used to determine a distance to the reflecting feature of the scene.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems. However, iToF systems have limited distance measurement capabilities. In this regard, to achieve low stochastic distance measurement errors, iToF systems require high modulation frequencies, which in turn lowers the distance range that can be measured unambiguously. For example, a 100 MHz modulation frequency results in an approximate unambiguous measurement range of 1.5 m. Also, a conventional iToF system is susceptible to errors due to multiple reflections and multiple propagation paths.

SUMMARY

According to a first aspect of the present invention, there is provided a method of generating a time domain echo waveform, the method comprising: a triggered source of pulsed electromagnetic radiation emitting a plurality of pulses of electromagnetic radiation in response to a trigger signal; a plurality of reflected echo signals of electromagnetic radiation irradiating an electromagnetic radiation detector cell, the electromagnetic radiation detector cell generating a plurality of stored electrical measurements in response to electromagnetic radiation incident thereupon; generating a time-varying mixing signal; respectively applying phase-shifted variations of the mixing signal to the electromagnetic radiation detector cell while generating the plurality of stored electrical measurements; a signal pre-processor reading out the plurality of stored electrical measurements from the electromagnetic radiation detector cell; a signal reconstruction unit generating a spectrum in respect of the plurality of stored electrical measurements and providing a spectrum of the mixing signal; the signal reconstruction unit generating a reconstruction signal spectrum by deconvolving the spectrum of the plurality of stored electrical measurements using the spectrum of the mixing signal; and the signal reconstruction unit generating the time domain echo waveform by converting the reconstruction signal spectrum to the time domain.

The time-varying function may be binary, although higher logic levels may be employed, for example tri-state logic. The time-varying function may be N bits in length. The time-varying mixing signal may be a Pseudorandom Binary Sequence (PRBS) signal.

Deconvolving the spectrum of the plurality of accumulated electrical measurements may comprise inverse filtering the spectrum of the plurality of stored electrical measurements with the spectrum of the mixing signal.

The time-varying mixing signal may be a periodic signal.

Deconvolving the spectrum of the plurality of stored electrical measurements may comprise Wiener deconvolving the spectrum of the plurality of stored electrical measurements with the spectrum of the mixing signal.

The phase-shifted variations of the mixing signal may be generated by serially phase shifting the mixing signal.

The photodetector cell may be a photonic mixer device.

The photonic mixer device may comprise a modulation electrode; the method may further comprise: applying the phase shifted variations of the mixing signal to the modulation electrode.

The method may further comprise: providing a time-varying mixing signal generator to apply respectively the phase-shifted variations of the mixing signal to the electromagnetic radiation detector cell; generating the trigger signal; applying the trigger signal to the triggered source of pulsed electromagnetic radiation; and applying the trigger signal substantially simultaneously to the time-varying mixing signal generator.

According to a second aspect of the invention, there is provided a method of measuring a range to a reflecting object comprising: detecting a reflected pulse of electromagnetic radiation by analysing the time domain echo waveform generated using the method of generating the time domain echo waveform as set forth above in relation to the first aspect of the invention.

The method may further comprise: calculating the range in respect of a reflected pulse of the plurality of reflected electromagnetic pulses using the detected reflected echo signal.

Generating a stored electrical measurement of the plurality of stored electrical measurements may comprise: a predetermined number of the plurality of reflected pulses of electromagnetic radiation being successively incident upon the electromagnetic radiation detector cell and the electromagnetic radiation detector cell respectively generating a corresponding number of individual electrical measurements in response thereto; applying a variation of the phase-shifted variations of the mixing signal to the electromagnetic radiation detector cell while generating the corresponding number of individual electrical measurements; and accumulating the corresponding number of individual electrical measurements.

A stored electrical measurement of the plurality of stored electrical measurements may be in respect of a number of reflected echo signals of the plurality of reflected echo signals of electromagnetic radiation. The number of echo signals may be one echo signal.

The method may further comprise: providing a plurality of electromagnetic radiation detector cells comprising the electromagnetic radiation detector cell; applying each variation of the phase-shifted variations of the mixing signal to the plurality of electromagnetic radiation detector cells while each of the plurality of electromagnetic radiation detector cells respectively generates the plurality of stored electrical measurements in respect of each variation of the phase-shifted variations of the mixing signal; the signal pre-processor respectively reading out substantially in parallel the stored electrical measurements from the plurality of electromagnetic radiation detector cells, each reading out being in respect of the each variation of the phase-shifted variations of the mixing signal; the signal pre-processor aggregating in respect of each parallel reading out the electrical measurements read out from the plurality of electromagnetic radiation detector cells, thereby generating a plurality of aggregated stored electrical measurements; the signal reconstruction unit generating a spectrum in respect of the plurality of aggregated stored electrical measurements and generating a spectrum of the mixing signal; the signal reconstruction unit generating a reconstruction signal spectrum by deconvolving the spectrum of the plurality of aggregated stored electrical measurements using the spectrum of the mixing signal; and the signal reconstruction unit generating the time domain echo waveform by converting the reconstruction signal spectrum to the time domain.

The time domain echo waveform may be a representation in the electrical domain of the plurality of reflected pulses of electromagnetic radiation incident upon the electromagnetic radiation detector cell. The triggered source of pulsed electromagnetic radiation may generate a pulsed output as opposed to a continuous wave output.

According to a third aspect of the invention, there is provided an electromagnetic radiation echo waveform generation system comprising: a triggered source of pulsed electromagnetic radiation configured to emit a plurality of pulses of electromagnetic radiation in response to a trigger signal; an electromagnetic radiation detector cell configured to generate a plurality of stored electrical measurements in response to a plurality of reflected echo signals of electromagnetic radiation irradiating the electromagnetic radiation detector cell; a time-varying mixing signal generator configured to apply phase-shifted variations of a mixing signal to the electromagnetic radiation detector cell while generating the plurality of stored electrical measurements; and a signal pre-processor configured to read out the plurality of stored electrical measurements from the electromagnetic radiation detector cell; wherein a signal reconstruction unit is configured to generate a spectrum in respect of the plurality of stored electrical measurements and to generate a spectrum of the mixing signal; the signal reconstruction unit is configured to generate a reconstruction signal spectrum by deconvolving the spectrum of the plurality of stored electrical measurements using the spectrum of the mixing signal; and the signal reconstruction unit is configured to generate the time domain echo waveform by converting the reconstruction signal spectrum to the time domain.

It is thus possible to provide a method of generating a time domain echo waveform and an electromagnetic radiation echo waveform generation system that support measurement of greater ranges of direct ToF systems with the lower bandwidth requirements of the iToF systems. Additionally, the method and system are capable of reconstructing a time domain echo waveform and are capable of resolving multiple reflections and/or multiple propagation paths.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
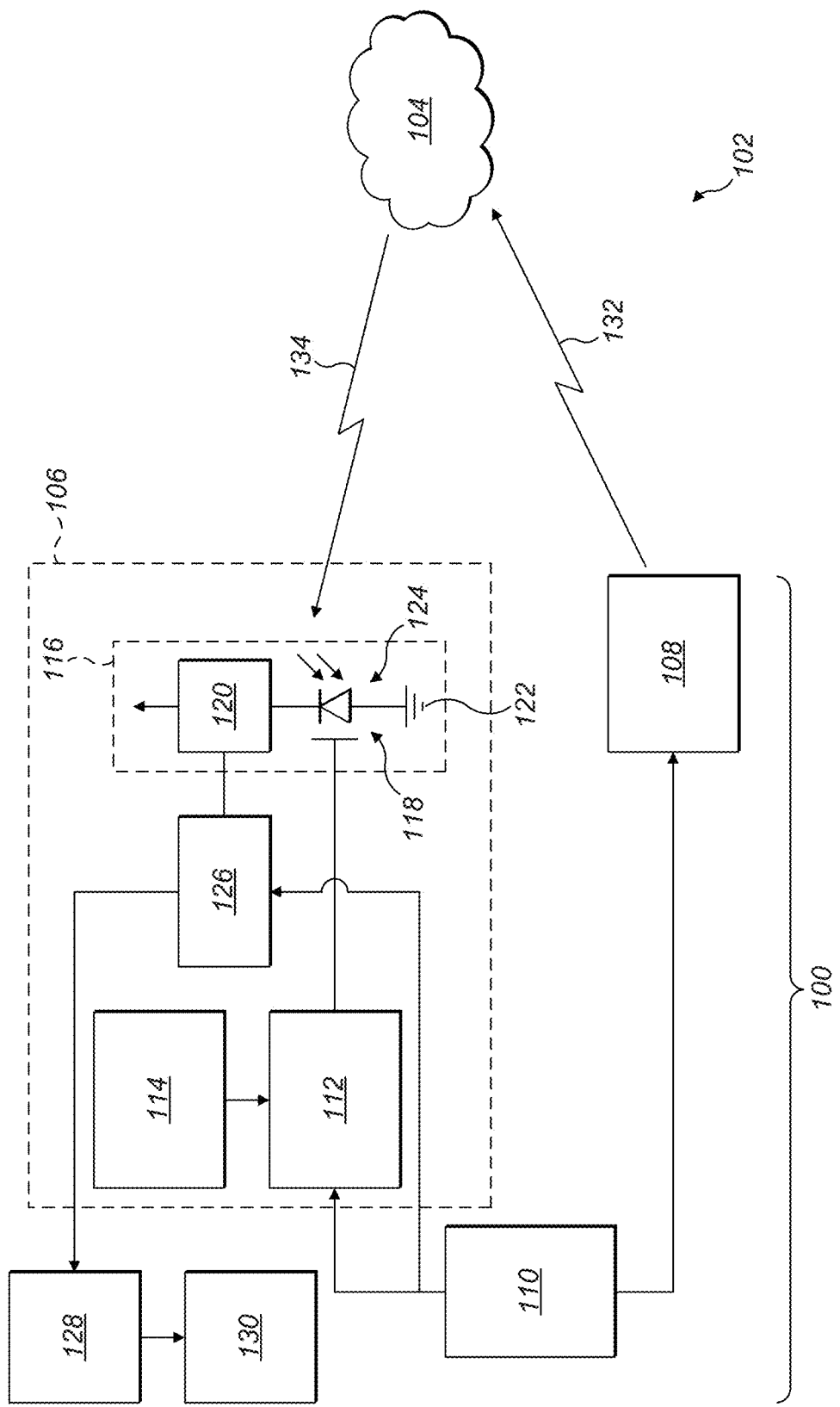
FIG. 1 is a schematic diagram of a distance measurement system disposed in a scene and comprising an electromagnetic radiation detector device constituting an embodiment of the invention.

Throughout the following description, identical reference numerals will be used to identify like parts.

Referring to FIG. 1, an electromagnetic radiation ranging system, for example a pulsed-light detection and ranging system 100 is, for example, disposed within an environment to monitor a so-called scene 102. A typical application for the system 100 is in a LIDAR system. The scene 102 comprises a reflective object 104.

The system 100 comprises a detection circuit 106 and an illumination source, for example a pulsed optical or light source 108, such as a pulsed-laser, or a laser diode. In this regard, the source of electromagnetic radiation 108 provides a pulsed output as opposed to a continuous wave output, the distinction being evident to the person skilled in the art. Although not shown, the optical source 108, in this example, comprises optics and/or filters for modifying the optical energy emitted by the optical source 108. A pulse generator 110 is operably coupled to the optical source 108 and a signal generator 112, for example a time-varying binary signal generator, such as a Pseudorandom Binary Sequence (PRBS) signal generator, the signal generator 112 being operably coupled to a phase selector unit 114. The signal generator 112 is operably coupled to a photodetector cell 116, in this example, by way of a modulation electrode 118 of a photonic mixer 124. The photonic mixer 124 can be any suitable kind of photogate device for example of the type described in "3D Camera Based On Gain-Modulated Cmos Avalanche Photodiodes" (O. Shcherbakova, PhD Dissertation, April 2013, https://core.ac.uk/download/pdf/35317180.pdf). Although not shown, it should be appreciated that the detection circuit 106 comprises an array of photodetector cells, but for the sake of clarity and conciseness of description only the photodetector cell 116 is shown and mostly described herein. An optical system (also not shown) comprising, for example a lens, such as a focussing lens, can also be provided adjacent the array of photonic mixers of the detection circuit 106.

The photodetector cell 116 comprises a signal accumulation unit, for example an integrator 120 having an input operably coupled to the photonic mixer device 118 controlled by the signal generator 112. An output of the integrator 120 is operably coupled to a signal pre-processor, for example a signal preparation and conditioning circuit 126, an output of the signal preparation and conditioning circuit 126 being operably coupled to an input of a signal reconstruction unit 128. The signal preparation and conditioning circuit 126 is also operably coupled to the pulse generator 110. The signal preparation and conditioning circuit 126 typically comprises amplification circuitry, analogue-to-digital conversion circuitry and, optionally, low pass filtering to address aliasing during analogue-to-digital conversion, in order to yield an output signal that can be processed by the signal reconstruction unit 128 and a microprocessor 130, which is operably coupled to the signal reconstruction unit 128. Optionally, extra filtering, for example optimal filtering, low pass filtering or Gaussian filtering, can be applied by the signal reconstruction unit 128. The microprocessor 130 constitutes a processing resource and is typically supported by a non-volatile memory, for example a Read Only Memory and a volatile memory, for example a Random Access Memory (not shown). Although, in this example, the pulse generator 110 is coupled to the signal preparation and conditioning circuit 126, the skilled person should appreciate that synchronisation can be achieved by coupling the pulse generator 110 to other functional elements of the apparatus 100, for example the microprocessor 130.

The microprocessor 130 supports a number of functional units, for example a pulse analyser (not shown) in order to determine a range to a reflecting object, for example the object 104. The pulse analyser can implement any suitable signal processing technique to obtain such range information, for example as described in co-pending European patent application no. 18165668.7, the content of which is incorporated herein by reference.

In operation, the signal reconstruction unit 128 deconvolves an electrical measurement provided at the output of the integrator 120 and processed by the signal preparation and conditioning circuit 126, the electrical measurement having been pre-processed with a phase-variable mixing signal provided by the signal generator 112, in order to recover an analogue echo waveform.

The pulsed-light detection and ranging system 100 relies upon a cross-correlation function in order to obtain cross-correlation terms by applying phase shifted variations of a mixing signal to a photocurrent generated by the photonic mixer device 118. In this regard, the photocurrent is generated in response to light incident upon the photonic mixer 124 and the charge associated with the photocurrent is subsequently stored in the integrator 120, or in the case of an array of photodetector cells 116 an aggregation of the stored charges of the individual photodetector cells 116 is considered. The cross-correlation function is:

$$c_\varphi = \int o(t-\Delta t_d) \cdot m(t-\Delta t_\varphi) \quad (1)$$

where $c_\varphi$ is a cross-correlation term, $o(t)$ is a photocurrent generated in response to a received reflected optical signal and $m(t)$ is a mixing or demodulation function.

The above expression can be re-written as the following convolution:

$$c_\varphi = o * m \quad (2)$$

where $o$ is the photocurrent generated in response to an incident optical signal in the time domain and $m$ is the mixing signal in the time domain. In order to recover an electrical measurement of the incident optical signal from the cross-correlation term, $c_\varphi$, the above equation (2) can be used in conjunction with deconvolution in the frequency domain. In this regard, in order to deconvolve the above convolution, a Fast Fourier Transform (FFT) needs to be performed on the electrical measurement signal constituting the cross-correlation term, $c_\varphi$, and the mixing signal, $m$:

$$c_\varphi \xrightarrow{FFT} C$$

$$m \xrightarrow{FFT} M$$

Using these Fourier transforms, equation (2) can simply be rearranged to achieve basic deconvolution:

$$\frac{C}{M} = O \quad (3)$$

where $O$ is the spectrum of the electrical measurement of the incident optical signal. In order to convert the frequency domain representation of the electrical measurement to the time domain, the spectrum of the deconvolved cross-correlation term, $c_\varphi$, is subjected to an Inverse FFT (IFFT):

$$O \xrightarrow{\text{IFFT}} o$$

Another known deconvolution technique can be employed instead of equation (3), namely Wiener deconvolution:

$$\frac{C}{M} \frac{|M|^2}{|M|^2 + K} = O \quad (4)$$

where K is a function defined by the noise spectrum.

As in the case of equation (3), the electrical measurement in the time domain of the received optical signal can be obtained by performing an IFFT on the spectrum of the electrical measurement of the received optical signal, O.

Figure 2:
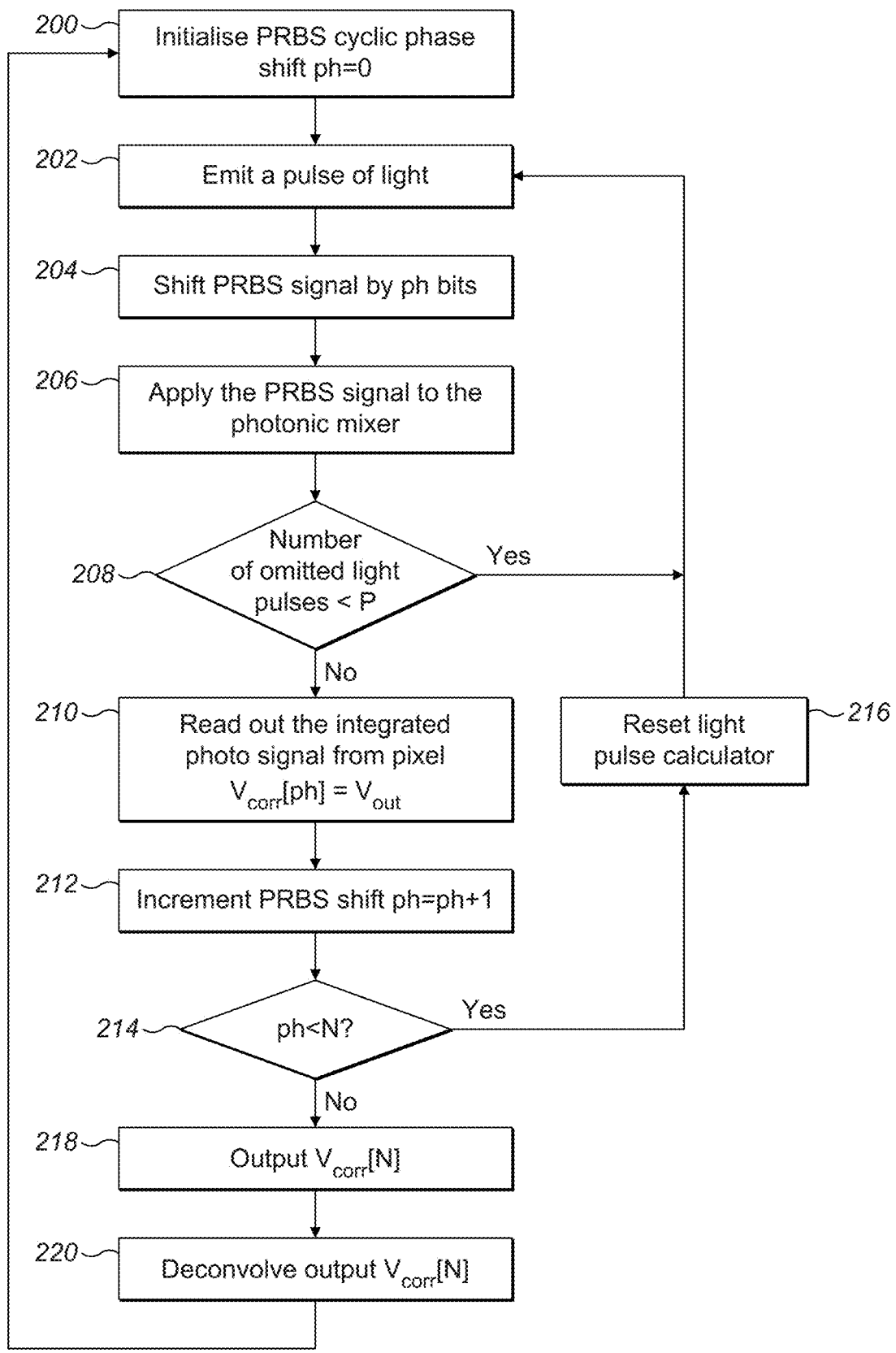
FIG. 2 is flow diagram of a method of generating a time domain echo waveform used by the embodiment of FIG. 1.

Referring to FIG. 2, upon powering up the system 100, the phase selector unit 114 initialises (Step 200) a cyclic phase shift counter, ph, to zero. The pulsed optical source 108 emits (Step 202) pulses of light 132 for example in response to, i.e. triggered by, the pulse generator 110, which illuminate the scene 102 and are incident upon the reflective object 104. The trigger signals generated by the pulse generator 110 are also substantially simultaneously communicated to the signal generator 112 and the signal preparation and conditioning unit 126. Light 132 incident upon the object 104 is reflected by the object 104, the amount of the light 132 reflected depending upon the reflectivity of the object 104. Reflected light 134 is received by the array of photodetector cells 116 and converted to the electrical domain in the form of a time varying analogue output signal proportional to the intensity of reflected light 134 received by the array of photodetector cells 116 over a period of time. Receipt of the trigger or sync signal by the signal generator 112 and the signal preparation and conditioning circuit 126 is used as an indication of when, in time, to start "recording" the electrical measurements generated by the array of photodetector cells 116.

While the optical source 108 is emitting the pulses of light 132, the detection circuit 106 is translating the optical energy received at the photodetector cell 116 to the electrical measurements as follows. In accordance with the above-described methodology, the signal generator 112 generates a mixing signal having, in this example a flat spectrum, for example a time-varying mixing signal, such as a PRBS mixing signal. The use of a mixing signal having a flat spectrum is beneficial, but not essential. The mixing signal can be N bits in length, the length being dependent upon the frequency of the mixing signal and the observation range of the apparatus. For example, at a frequency of 100 MHz and a sequence length of 128 bits, an unambiguous range of approximately 150 m can be achieved. A sequence length of 256 bits can yield an unambiguous range of about 300 m. The phase selector 114 issues a control signal to the signal generator 112 to shift (Step 204) the phase of the PRBS mixing signal by ph bits, and the phase-shifted PRBS mixing signal is applied (Step 206) to the photonic mixer device 118 of the photodetector cell 116 in order to mix the photocurrent, generated in response to the received light 134 by the photonic mixer 124, with the phase-shifted PRBS mixing signal. The photonic mixer 124 generates a photocurrent signal, which is responsive to the optical energy received thereby and the PRBS mixing signal applied to the modulation electrode 118 of the photonic mixer 124. The photocurrent signal is accumulated in the integrator 120.

The signal preparation and conditioning circuit 126 determines (Step 208) whether P pulses of light have been emitted in order to determine when photocurrents in respect of P successive received optical echo signals have been accumulated by the integrator 120. In the event that an insufficient number of photocurrents have been generated, because an insufficient number of reflected optical echo signals have been received, the signal preparation and conditioning circuit 126 awaits generation of P photocurrents. As such, the same variation of the phase-shifted mixing signal, i.e. the mixing signal with the same phase shift applied thereto, is applied to the photonic mixer 124 in respect of the P successive received optical echo signals via the modulation electrode 118 of the photonic mixer 124. It should therefore be appreciated that, in this example, a given stored electrical measurement is in respect of a number of reflected echo signals of light.

When a predetermined number, P, of optical pulses have been emitted and the corresponding successive photocurrents in respect of reflected echo signals generated, the signal preparation and conditioning circuit 126 reads out (Step 210) an integrated photocurrent, constituting an electrical measurement, and measures the value of the integrated photocurrent and stores the value of the electrical measurement.

In practice, the system 100 comprises a plurality of photodetector cells 116. Therefore, for each variation (of the phase-shifted variations) of the mixing signal applied to the plurality of photodetector cells 116 while generating their respective electrical measurements, the stored electrical measurements respectively generated by the plurality of photodetector cells 116 in respect of each variation are read out by the signal preparation and conditioning circuit 126 substantially in parallel, aggregated and stored in respect of each phase-shift. For example, for a first phase shift, $ph_1$, the electrical measurements generated using the first phase shift, $ph_1$, and stored in all the photodetector cells 116 of the array of photodetector cells are read out substantially in parallel, aggregated and stored in respect of the first phase shift, $ph_1$. Similarly, for subsequent phase shifts, $ph_n$, this process is repeated. The aggregated electrical measurement, generation or recordal are stored, for example as a vector, $V_{corr}$[ph], such as in memory (not shown), corresponding to the phase shift, ph, currently being applied. The phase selector 114 then increments (Step 212) the cyclic phase shift counter, ph, by unity. In this regard, the phase of the mixing signal is shifted serially to achieve the variations of the phase-shifted mixing signal.

The phase selector 114 then determines (Step 214) whether the phase shift counter, ph, is still less than a predetermined limit, N, corresponding to the length of the mixing signal. In the event that the predetermined limit, N, has not been reached, the integrator 120 is cleared, as are any temporary storage elements (Step 216) used by the signal preparation and conditioning circuit 126 used in the process of measuring the values stored by the integrator 120, and the above-described measurement steps (Steps 202 to 212) are repeated and new, subsequently generated, electrical measurements are appended to the electrical measurement vector, $V_{corr}$[ph], until all measurements in respect of a complete cycle of phase shifts have been made. Thus, the photodetector cell 116 generates multiple stored electrical measurements over time and in correspondence with the different variations of the phase-shifted mixing signal. From the above steps, it can be seen that phase-shifted variations of the mixing signal are applied to the photonic mixer 124 of the photodetector cell 116 during generation of the stored electrical measurements, the applications being in respect of successive pulses of light or successive sets of pulses of light.

However, in the event that the cyclic phase shift counter, ph, has reached the predetermined limit, N, the electrical measurement vector $V_{corr}[N]$ in respect of a complete cycle of phase shifts is considered a complete output (Step 218) and the signal reconstruction unit 128 then proceeds to deconvolve (Step 220) the electrical measurements generated in respect of the phase shifts applied.

Figure 3:
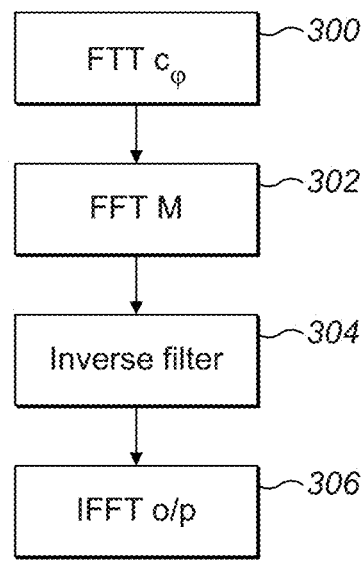
FIG. 3 is a flow diagram of a reconstruction process of FIG. 2 in greater detail and constituting another embodiment of the invention.
Figure 4:
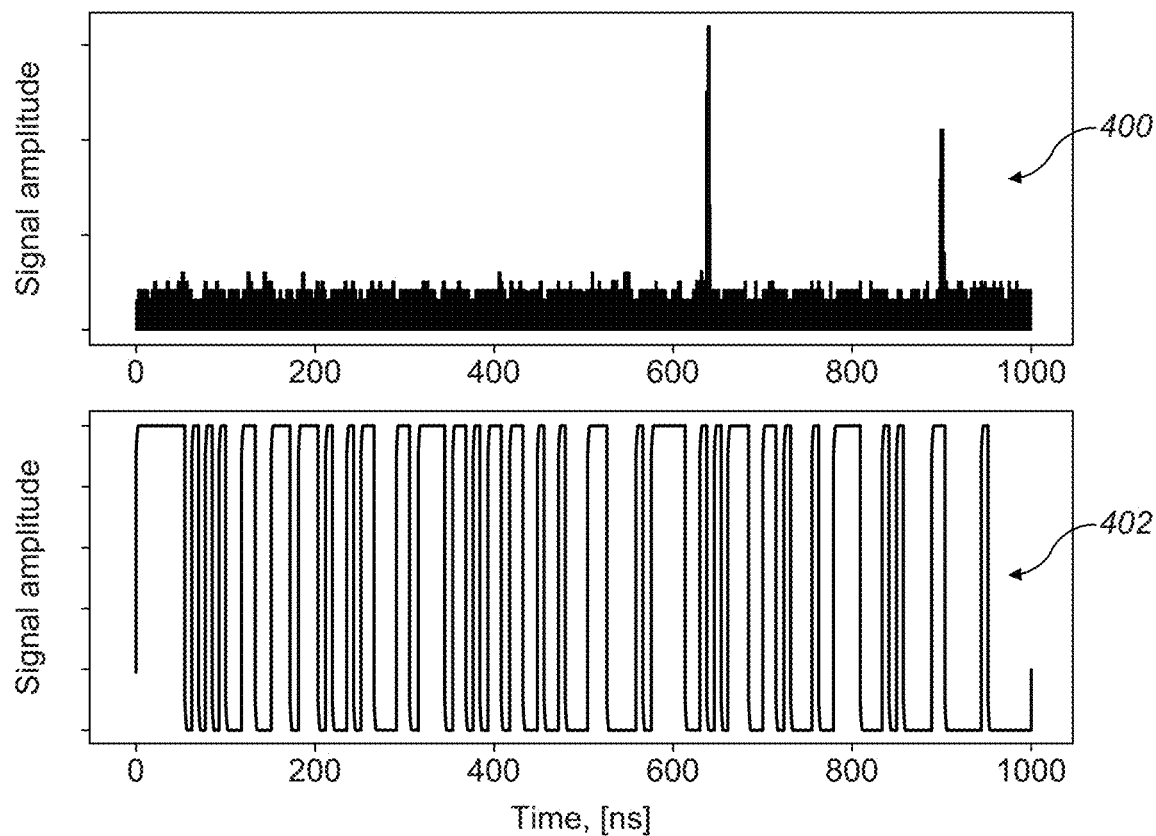
FIG. 4 is a graph of a measured optical signal and a mixing signal used in the embodiments of FIGS. 1 to 3.
Figure 5:
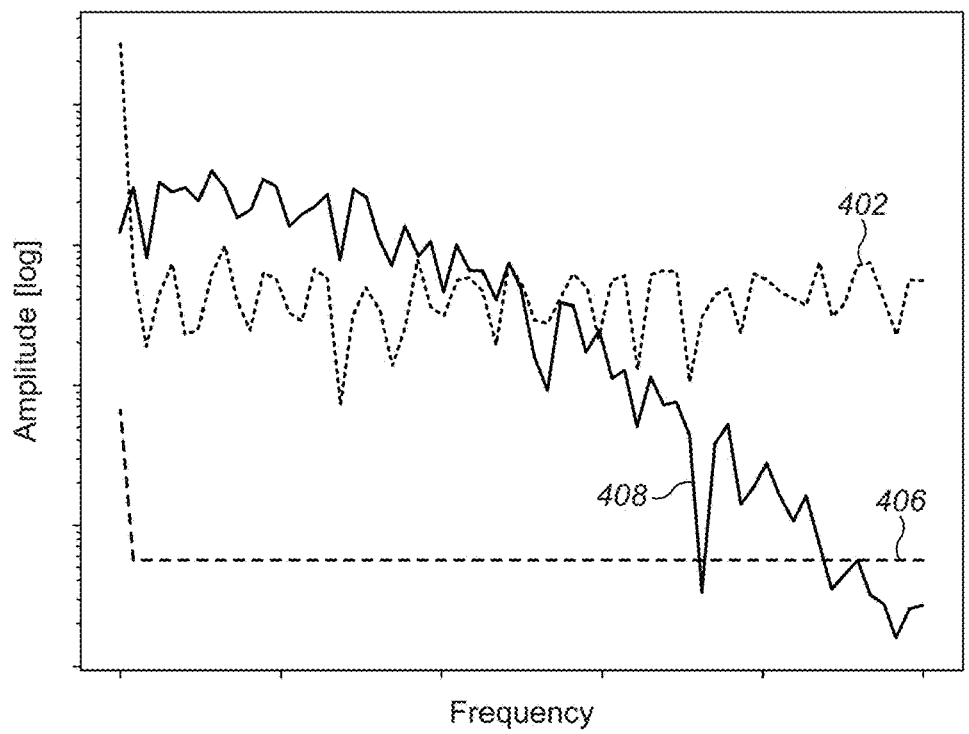
FIG. 5 is a graph of the spectrum of the measured optical signal, the mixing signal and a reconstructed signal.

In this regard, and in one embodiment (FIGS. 3, 4 and 5), the signal reconstruction unit 128 performs an FFT on the electrical measurement vector, $V_{corr}[N]$, (Step 300) and an FFT on the PRBS mixing signal 402 (Step 302) to yield the spectrum, C, of the cross-correlation signal, $c_\varphi$, 404 which in this example is the electrical measurement vector, $V_{corr}[N]$, and the spectrum of the PRBS mixing signal, M, 406. The resulting FFT of the electrical measurement vector, $V_{corr}[N]$, is then inverse filtered (Step 304) using the FFT of the PRBS mixing signal 406 according to equation (3) above and then, for example, low-pass Gaussian filtered. This yields a reconstruction signal spectrum, for example a filtered spectrum 408 of a recovered echo waveform 400.

Figure 6:
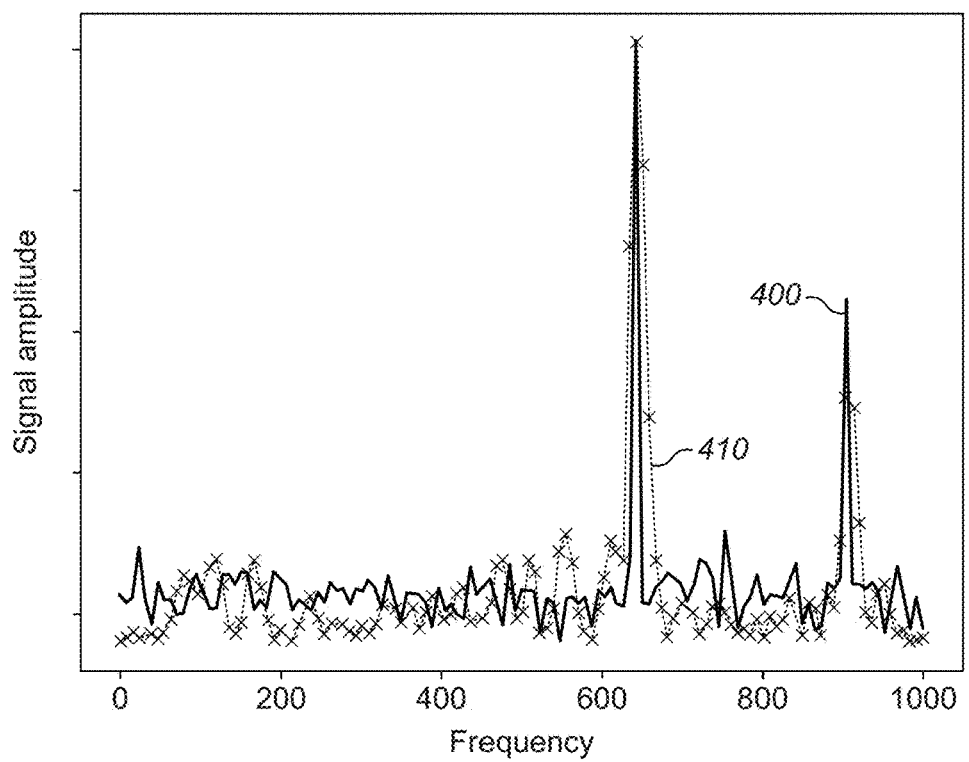
FIG. 6 is a graph comparing a recovered echo waveform and the received optical signal when employing the method of FIGS. 2 and 3.

Referring to FIG. 6, once inverse filtered, the time domain echo waveform 410 is obtained by performing the IFFT (Step 306) on the output of the inverse filtering process, namely the spectrum of the recovered echo waveform 408. In this regard, the reconstruction signal spectrum 408 is converted to the time domain. As can be seen from the comparison of FIG. 6, the recovered time domain echo waveform 410 tracks the original received reflected optical signal 400 well. The time domain echo waveform 410 is a representation, in the time domain, of the plurality of reflected pulses of light incident upon the photodetector cell 116.

Figure 7:
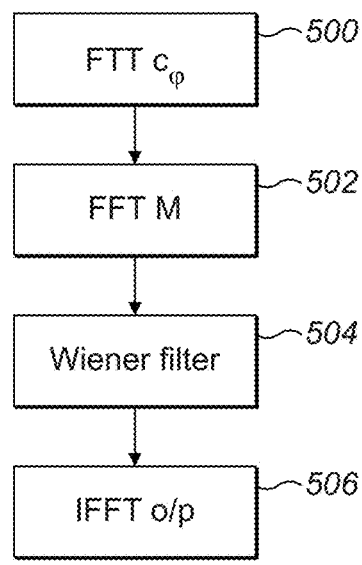
FIG. 7 is a flow diagram of another reconstruction process of FIG. 2 in greater detail and constituting a further embodiment of the invention.
Figure 8:
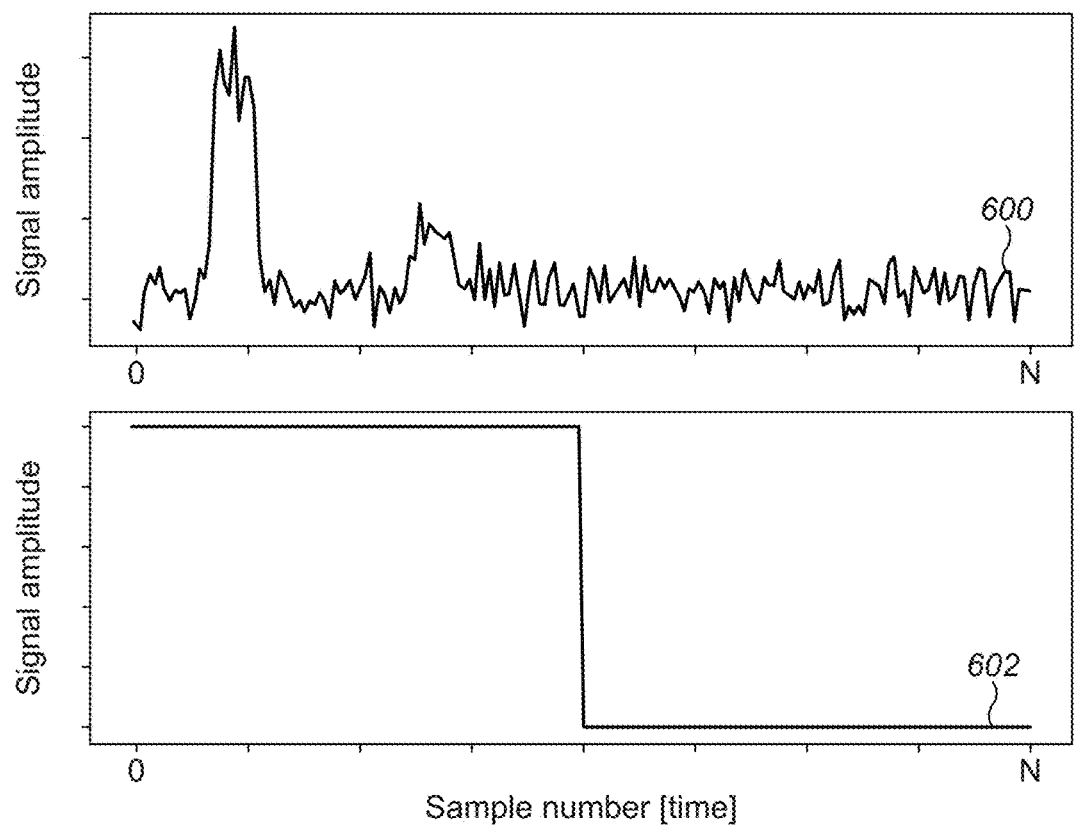
FIG. 8 is a graph of another measured optical signal and another mixing signal used in accordance the embodiments of FIGS. 1, 2 and 7.
Figure 9:
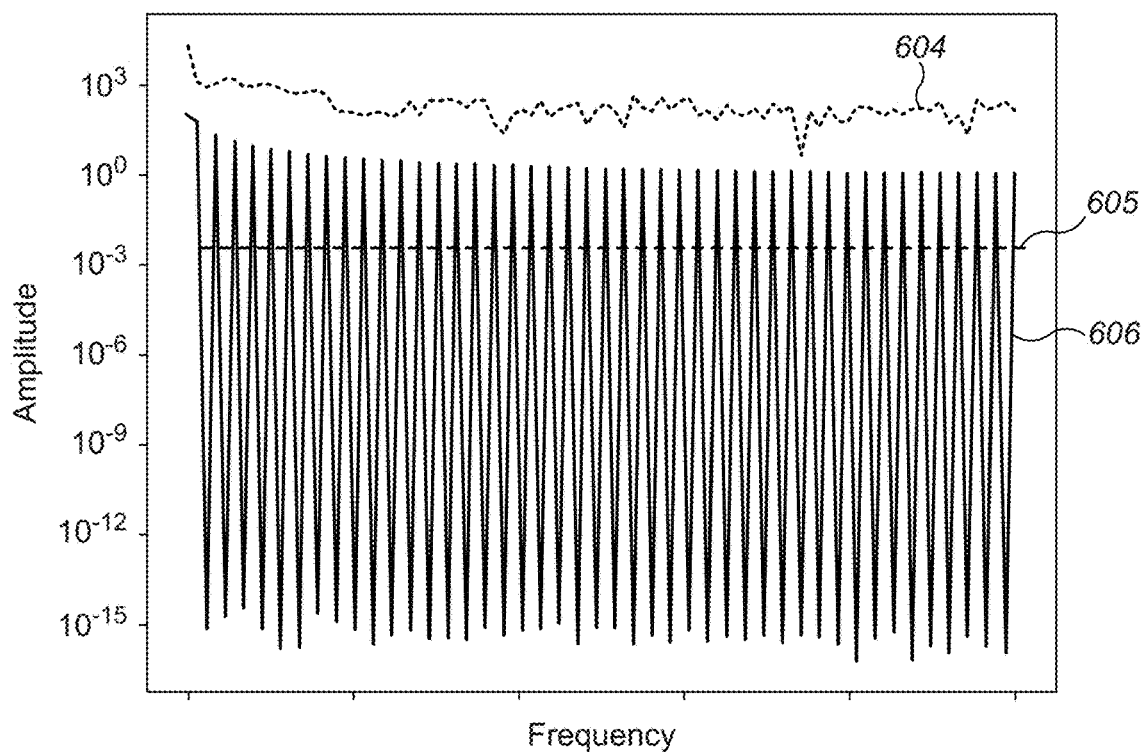
FIG. 9 is a graph of the spectrum of the measured optical signal and the mixing signal of FIG. 8.

In another embodiment (FIGS. 7, 8 and 9), as in the previous example, the signal reconstruction unit 128 performs an FFT on the electrical measurement vector, $V_{corr}[N]$, 600 (Step 500) to generate the spectrum, C, 604 of the cross-correlation signal, $c_\varphi$. However, in this example, the mixing signal employed is a simple periodic function mixing signal 602, for example a square wave signal, and so the signal reconstruction unit 128 performs an FFT on the mixing signal 602 (Step 502) to generate the spectrum of the periodic function mixing signal, M, 606. The function, K, of equation (4) above defines a minimum value for the spectrum of the mixing signal, M, 606 as shown by the horizonal broken line 605. The resulting FFT of the electrical measurement vector, $V_{corr}[N]$, is then Wiener filtered (Step 504) using the FFT of the periodic function mixing signal 606 according to equation (4) above.

Figure 10:
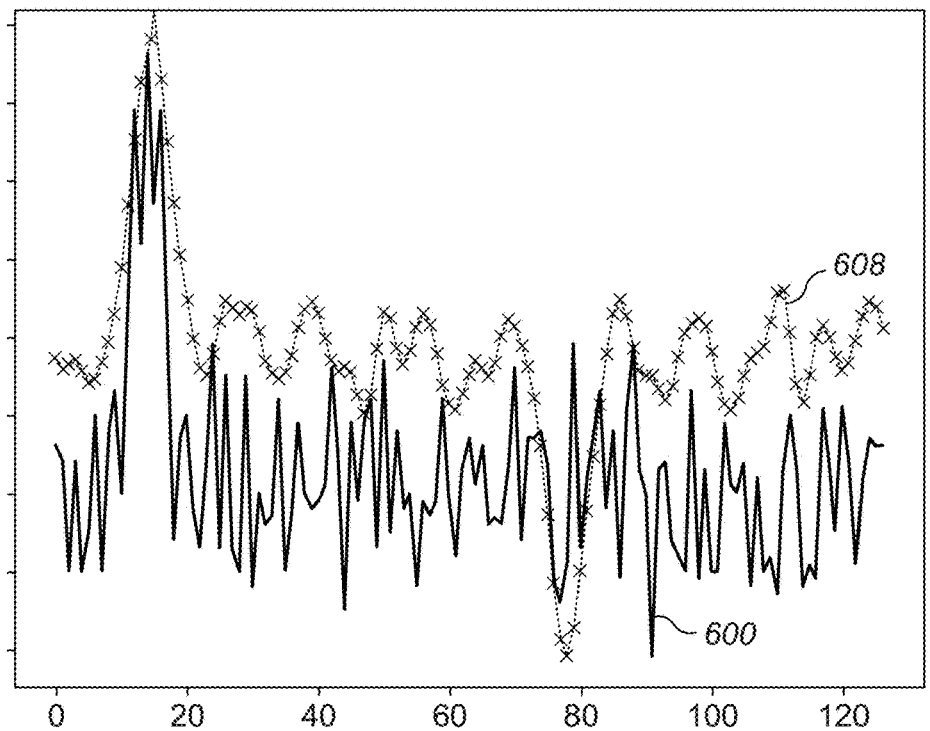
FIG. 10 is a graph comparing the recovered echo waveform and the received optical signal when employing the method of FIGS. 2 and 7.

Referring to FIG. 10, once Wiener filtered, the time domain echo waveform 608 is obtained by performing the IFFT (Step 506) on the output of the Wiener filtering. As can be seen from the comparison of FIG. 10, the recovered time domain echo waveform 608 tracks original received reflected optical signal 600.

Once the time domain echo waveform 410, 608 has been recovered by the signal reconstruction unit 128, the digital time domain echo waveform 410, 608 is communicated to the microprocessor 130 that post-processes the echo waveform 410, 608, for example analyses the peaks of the digitised echo waveform 410, 608 to identify reflected optical pulses and to determine ranges to the cause of the reflection, for example as described in co-pending European patent application no. 18165668.7 mentioned above.

The skilled person should appreciate that the above-described implementations are merely examples of the various implementations that are conceivable within the scope of the appended claims. Indeed, it should be appreciated that, for example, other mixing signals can be employed that have a suitable spectral distribution.

Although, in the above examples, the electrical signals generated by the photonic mixer 124 is derived from the number, P, of photocurrents generated in respect of P successive reflected optical echo signals being incident upon the photodetector cell 116, it should be appreciated that this practice is optional and the stored electrical signal can be generated from a single photocurrent generated by the photonic mixer 124 in response to a single reflected optical echo signal.

It should be appreciated that the use of programmable elements set forth herein are purely exemplary and the skilled person will appreciate that programmable elements can be replaced with a "hard wired" implementation, for example a circuit employing digital logic.

Although the spectrum of the mixing signal is generated herein in real time, or "on-the-fly", it should be appreciated that the spectrum, M, of the mixing signal can be predetermined, stored, and provided for example by retrieval from a memory for subsequent use in the methods set forth herein.

In the above examples, the mixing signal is a PRBS or a periodic signal. It should be understood that the term period is being employed in the sense that a cycle of the periodic signal is applied on a burst-by-burst basis, i.e. in respect of each emission of the optical source 108. Indeed, this is an example of the mixing signal being derived from a periodic signal. The signal also possesses the property of being capable of being shifted in time. This property is desirable for all types of mixing signal. It should therefore be appreciated that any suitable signal that comprises a time-varying portion that is repeatable can be employed to provide the mixing signal, for example a periodic signal, although repeatable aperiodic signals or portions of aperiodic signals can be employed. In some embodiments, the mixing signal can be an analogue signal.

It should be appreciated that references herein to "light", other than where expressly stated otherwise, are intended as references relating to the optical range of the electromagnetic spectrum, for example, between about 350 nm and about 2000 nm, such as between about 550 nm and about 1550 nm or between about 600 nm and about 1000 nm.

Use herein of specific functional units should be understood as being exemplary only and the skilled person will appreciate that such functionality can be provided in different functional units and/or distributed over a number of functional units.

Alternative embodiments of the invention can be implemented as a computer program product for use with a computer system, the computer program product being, for example, a series of computer instructions stored on a tangible data recording medium, such as a diskette, CD-ROM, ROM, digital memory or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. A method of generating a time domain echo waveform, the method comprising:

a triggered source of pulsed electromagnetic radiation emitting a plurality of pulses of electromagnetic radiation in response to a trigger signal;

a plurality of reflected echo signals of electromagnetic radiation irradiating an electromagnetic radiation detector cell, the electromagnetic radiation detector cell generating a plurality of stored electrical measurements in response to electromagnetic radiation incident thereupon;

generating a time-varying mixing signal;

respectively applying phase-shifted variations of the mixing signal to the electromagnetic radiation detector cell while generating the plurality of stored electrical measurements;

a signal pre-processor reading out the plurality of stored electrical measurements from the electromagnetic radiation detector cell;

a signal reconstruction unit generating a spectrum in respect of the plurality of stored electrical measurements and providing a spectrum of the mixing signal;

the signal reconstruction unit generating a reconstruction signal spectrum by deconvolving the spectrum of the plurality of stored electrical measurements using the spectrum of the mixing signal; and the signal reconstruction unit generating the time domain echo waveform by converting the reconstruction signal spectrum to the time domain.

2. The method according to claim 1, wherein the time-varying mixing signal is a Pseudorandom Binary Sequence (PRBS) signal.

3. The method according to claim 2, wherein deconvolving the spectrum of the plurality of stored electrical measurements comprises inverse filtering the spectrum of the plurality of stored electrical measurements with the spectrum of the mixing signal.

4. The method according to claim 1, wherein the time-varying mixing signal is a periodic signal.

5. The method according to claim 4, wherein deconvolving the spectrum of the plurality of stored electrical measurements comprises Wiener deconvolving the spectrum of the plurality of stored electrical measurements with the spectrum of the mixing signal.

6. The method according to claim 1, wherein the phase-shifted variations of the mixing signal are generated by serially phase shifting the mixing signal.

7. The method according to claim 1, wherein the electromagnetic radiation detector cell is a photonic mixer device.

8. The method according to claim 7, wherein the photonic mixer device comprises a modulation electrode, the method further comprising:

applying the phase shifted variations of the mixing signal to the modulation electrode.

9. The method according to claim 1, further comprising:

providing a time-varying mixing signal generator to apply respectively the phase-shifted variations of the mixing signal to the electromagnetic radiation detector cell;

generating the trigger signal;

applying the trigger signal to the triggered source of pulsed electromagnetic radiation; and applying the trigger signal substantially simultaneously to the time-varying mixing signal generator.

10. The method according to claim 1, wherein generating a stored electrical measurement of the plurality of stored electrical measurements comprises:

a predetermined number of the plurality of reflected echo signals of electromagnetic radiation being successively incident upon the electromagnetic radiation detector cell and the electromagnetic radiation detector cell respectively generating a corresponding number of individual electrical measurements in response thereto;

applying a variation of the phase-shifted variations of the mixing signal to the electromagnetic radiation detector cell while generating the corresponding number of individual electrical measurements; and accumulating the corresponding number of individual electrical measurements.

11. The method according to claim 1, wherein a stored electrical measurement of the plurality of stored electrical measurements is in respect of a number of reflected echo signals of the plurality of reflected echo signals of electromagnetic radiation.

12. The method according to claim 1, further comprising:

providing a plurality of electromagnetic radiation detector cells comprising the electromagnetic radiation detector cell;

applying each variation of the phase-shifted variations of the mixing signal to the plurality of electromagnetic radiation detector cells while each of the plurality of electromagnetic radiation detector cells respectively generates the plurality of stored electrical measurements in respect of each variation of the phase-shifted variations of the mixing signal;

the signal pre-processor respectively reading out substantially in parallel the stored electrical measurements from the plurality of electromagnetic radiation detector cells, each reading out being in respect of each variation of the phase-shifted variations of the mixing signal;

the signal pre-processor aggregating in respect of each parallel reading out the stored electrical measurements read out from the plurality of electromagnetic radiation detector cells, thereby generating a plurality of aggregated stored electrical measurements;

the signal reconstruction unit generating a spectrum in respect of the plurality of aggregated stored electrical measurements and generating a spectrum of the mixing signal;

the signal reconstruction unit generating a reconstruction signal spectrum by deconvolving the spectrum of the plurality of aggregated stored electrical measurements using the spectrum of the mixing signal; and the signal reconstruction unit generating the time domain echo waveform by converting the reconstruction signal spectrum to the time domain.

13. A method of measuring a range to a reflecting object comprising:

a triggered source of pulsed electromagnetic radiation emitting a plurality of pulses of electromagnetic radiation in response to a trigger signal;

a plurality of reflected echo signals of electromagnetic radiation irradiating an electromagnetic radiation detector cell, the electromagnetic radiation detector cell generating a plurality of stored electrical measurements in response to electromagnetic radiation incident thereupon;

generating a time-varying mixing signal;

respectively applying phase-shifted variations of the mixing signal to the electromagnetic radiation detector cell while generating the plurality of stored electrical measurements;

a signal pre-processor reading out the plurality of stored electrical measurements from the electromagnetic radiation detector cell;

a signal reconstruction unit generating a spectrum in respect of the plurality of stored electrical measurements and providing a spectrum of the mixing signal;

the signal reconstruction unit generating a reconstruction signal spectrum by deconvolving the spectrum of the plurality of stored electrical measurements using the spectrum of the mixing signal; and the signal reconstruction unit generating a time domain echo waveform by converting the reconstruction signal spectrum to the time domain; and detecting a reflected echo signal of electromagnetic radiation by analysing the time domain echo waveform generated.

14. The method according to claim 13, further comprising:

calculating the range in respect of a reflected pulse of the plurality of pulses of electromagnetic radiation using the reflected pulse.

15. The method according to claim 13, wherein generating a stored electrical measurement of the plurality of stored electrical measurements comprises:

a predetermined number of the plurality of reflected echo signals of electromagnetic radiation being successively incident upon the electromagnetic radiation detector cell and the electromagnetic radiation detector cell respectively generating a corresponding number of individual electrical measurements in response thereto;

applying a variation of the phase-shifted variations of the mixing signal to the electromagnetic radiation detector cell while generating the corresponding number of individual electrical measurements; and accumulating the corresponding number of individual electrical measurements.

16. The method according to claim 13, wherein a stored electrical measurement of the plurality of stored electrical measurements is in respect of a number of reflected echo signals of the plurality of reflected echo signals of electromagnetic radiation.

17. The method according to claim 13, further comprising:

providing a plurality of electromagnetic radiation detector cells comprising the electromagnetic radiation detector cell;

applying each variation of the phase-shifted variations of the mixing signal to the plurality of electromagnetic radiation detector cells while each of the plurality of electromagnetic radiation detector cells respectively generates the plurality of stored electrical measurements in respect of each variation of the phase-shifted variations of the mixing signal;

the signal pre-processor respectively reading out substantially in parallel the stored electrical measurements from the plurality of electromagnetic radiation detector cells, each reading out being in respect of each variation of the phase-shifted variations of the mixing signal;

the signal pre-processor aggregating in respect of each parallel reading out the stored electrical measurements read out from the plurality of electromagnetic radiation detector cells, thereby generating a plurality of aggregated stored electrical measurements;

the signal reconstruction unit generating a spectrum in respect of the plurality of aggregated stored electrical measurements and generating a spectrum of the mixing signal;

the signal reconstruction unit generating a reconstruction signal spectrum by deconvolving the spectrum of the plurality of aggregated stored electrical measurements using the spectrum of the mixing signal; and the signal reconstruction unit generating the time domain echo waveform by converting the reconstruction signal spectrum to the time domain.

18. An electromagnetic radiation echo waveform generation system comprising:

a triggered source of pulsed electromagnetic radiation configured to emit a plurality of pulses of electromagnetic radiation in response to a trigger signal;

an electromagnetic radiation detector cell configured to generate a plurality of stored electrical measurements in response to a plurality of reflected echo signals of electromagnetic radiation irradiating the electromagnetic radiation detector cell;

a time-varying mixing signal generator configured to apply phase-shifted variations of a mixing signal to the electromagnetic radiation detector cell while generating the plurality of stored electrical measurements; and a signal pre-processor configured to read out the plurality of stored electrical measurements from the electromagnetic radiation detector cell; wherein a signal reconstruction unit is configured to generate a spectrum in respect of the plurality of stored electrical measurements and to generate a spectrum of the mixing signal;

the signal reconstruction unit is configured to generate a reconstruction signal spectrum by deconvolving the spectrum of the plurality of stored electrical measurements using the spectrum of the mixing signal; and the signal reconstruction unit is configured to generate a time domain echo waveform by converting the reconstruction signal spectrum to the time domain.

* * * * *